Oct. 23, 1928.
A. ALTAMIRANO
1,688,678
PROCESS OF CLEANING THRASHED CEREALS
Filed Nov. 13, 1925
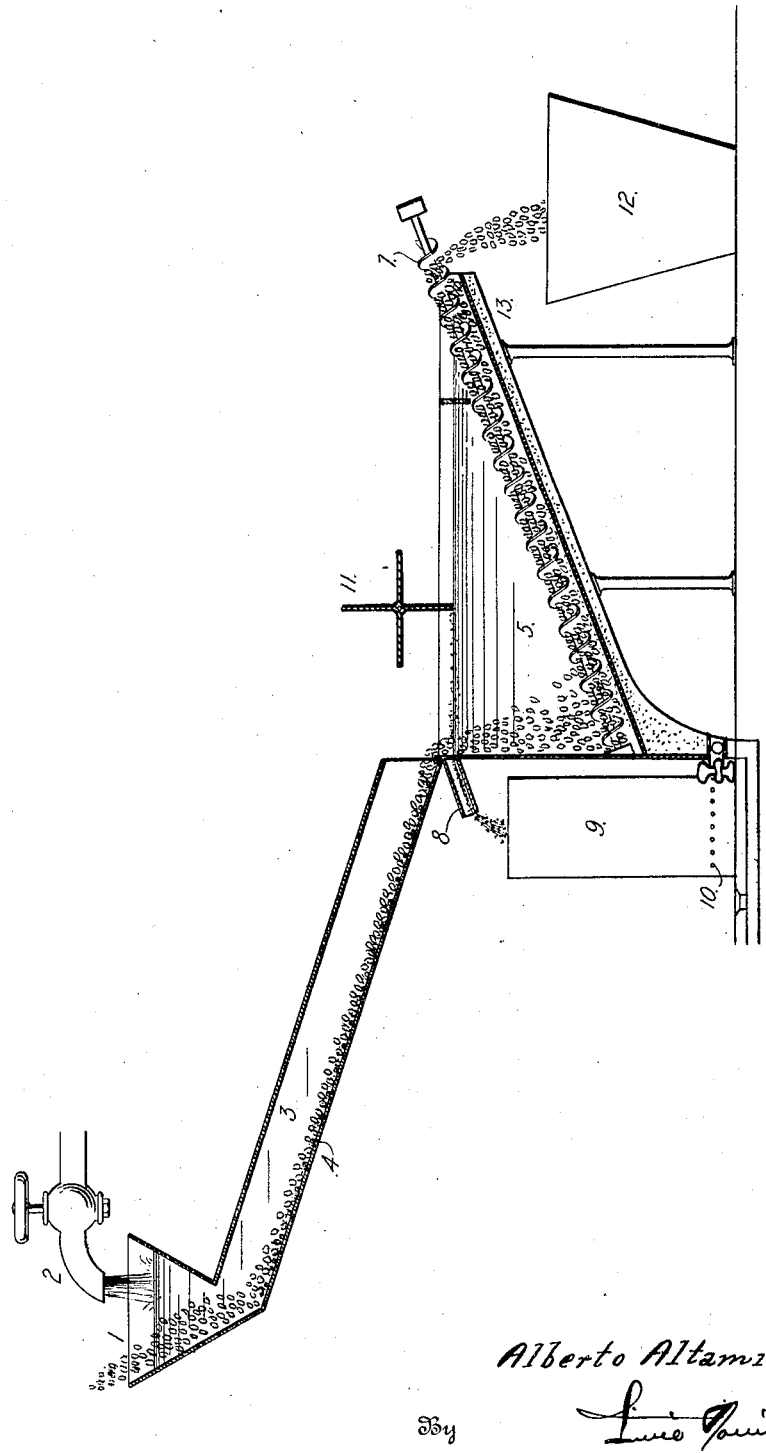
Inventor:
Alberto Altamirano
By
Attorney Patented Oct. 23, 1928.

1,688,678

UNITED STATES PATENT OFFICE.

ALBERTO ALTAMIRANO, OF MEXICO CITY, MEXICO, ASSIGNOR TO MOISÉS SOLANA, OF MEXICO CITY, MEXICO.

PROCESS OF CLEANING THRASHED CEREALS.

Application filed November 13, 1925, Serial No 68,916, and in Mexico December 24, 1924.

This invention relates to a process of cleaning thrashed raw corn, particularly corn intended for subsequent boiling in lime water, in order to convert it into the so-called "nixtamal" which is an old Mexican name for Indian corn or maize that has been boiled in lime water in order to soften the rather hard skin and also the starch of the grain.

Until now, it has been usual to charge the thrashed corn into tanks for boiling, and thereafter to clean it in different ways. According to my method, the cleaning is done while the corn is still raw and before it has been converted by boiling into "nixtamal".

The method generally used is quite unsatisfactory and imperfect, because not only do sand, earth, slime and clay cling to the grains, but also decayed particles of rotten grains with all kinds of fungoid growths are boiled together with the corn. When the corn swells as a result of the boiling, a considerable portion of the refuse sticks with even greater tenacity to the softened and slimy skin of the corn and consequently it is much more difficult to clean the corn, once it has been converted into the softened state. The nixtamal is ground and formed into a dough from which are made the baked pancakes called "Tortillas" that serve as a substitute for bread in Latin-America.

Even slight friction between the boiled grains has the effect of peeling off a great portion of the soft skin, so that in order to avoid the loss of much of such skin as the result of cleaning the boiled grains, it is evident that all the scrubbing of the grains should be carried on while the skin on the grains is hard and resistant.

My improved method comprises a preliminary dry-separating step of sifting off the particles which are smaller than the corn, followed by a wet-separating step which is carried out on an inclined chute or channel having transverse ribs over which the corn is made to pass by the action of a current of water.

The second step consists in discharging the corn, together with the water, into a tank where the floating particles are confined within a certain area of the water surface, thereafter removing such floating particles either continuously with the overflowing water, or periodically by skimming.

The third step consists in subjecting the corn, while submerged in the water, to a mechanical rubbing action and simultaneously raising it from the bottom of the tank out of the water in a clean condition, separated from the floating refuse, at a part of the water surface which is separate from that part upon which the corn was delivered, or at a clear part of the water surface which has been skimmed of floating particles. This may be done satisfactorily by means of an inclined screw conveyor which rises out of the water at a point where the surface is free from floating particles.

The fourth step consists in discharging upon a strainer the corn withdrawn from the water by the conveyor; whereupon the corn is sprinkled with clean water before it is transferred to the boiling vat in which it is converted into "nixtamal". The sprinkling with water may, in some cases, be dispensed with when the corn is already sufficiently clean.

The diagrammatic sectional view shown in the accompanying drawing represents by way of example, one form of apparatus for carrying out my method.

The corn, in thrashed condition and after having been subjected to the preliminary dry-separating or sifting treatment, is delivered, together with water from the pipe 2, into a hopper 1 from which leads a downwardly-inclined chute 3 provided with transverse ribs 4.

The lower end of this chute discharges the corn and water into a receptacle or tank 5, while the smaller particles, though heavier than the grains of corn, will be retained by the transverse ribs 4, from which latter they are periodically removed.

The tank 5 contains a partition 6 which is submerged in the water but rises above the water level, and the tank should be a little higher on the corn-discharging end where the screw conveyor 7 rises out of the water. The conveyor is disposed along the inclined bottom of the tank above a perforated plate or wire netting 13, through the meshes of which the small and heavy particles may sink to the bottom of the tank, whence they can be periodically extracted.

From the other end of the tank a spout 8 extends; and as it is disposed at a lower level than the top edge of the tank, the water will flow over this spout, carrying along with it all the floating particles which in this way are deflected and caused to fall into the strainer 9 through the perforations 10 of which the water escapes. All the floating particles are thus collected for other purposes.

Above the tank 5 is arranged a small water wheel 11 which, when turning, pushes the floating particles towards the spout 8 so that they will be discharged from the tank. A horizontally operating strickle (not shown) may be used for the same purpose.

The screw conveyor 7 delivers the corn to the boiling vat 12 if it has been cleaned enough by the friction action which takes place in the water. The corn is positively separated from the heavier particles like sand and earth, as well as from the lighter particles, which latter will float on a restricted portion of the surface of the water in the tank. Instead of being discharged directly into the boiling vat, the corn may be discharged upon a straining receptacle, in which it should be continuously sprinkled with clean water before it is transferred to the boiling vat.

What I claim is:—

1. A continuous process of cleaning thrashed corn and other cereals, comprising the steps of feeding the grains, while submerged in a moving current of water, through an extended, downwardly-inclined path and separating the heavier particles of impurities from the grains during their travel by the action of the current; discharging the grains and water at the bottom of said path directly upon the surface of the water in a vat; continuously forcing back the light floating particles and removing them at one side of the vat while keeping the surface of the water at the other side clear; and elevating the grains which sink to the bottom and removing them at the clear side of the vat, while subjecting them to a continuous rubbing action during their elevation.

2. A process, according to claim 1, in which the heavier particles of impurities separated from the grains are caught and retained at various points in the inclined path of travel of the grains and water and are periodically removed from such path.

In testimony whereof I have affixed my signature.

ALBERTO ALTAMIRANO.